Dec. 6, 1966 R. M. TILLMAN ET AL 3,290,512

ELECTROMAGNETIC TRANSDUCERS

Filed June 7, 1961 6 Sheets-Sheet 1

INVENTORS.
ROBERT M. TILLMAN
STANLEY SCHNEIDER
BY James J. Wood
ATTORNEY

| | 1 | 2 | 3 | 4 | 5 | 6 | 7 | 8 | 9 |
|---|---|---|---|---|---|---|---|---|---|
| 1 | 2 1 | 3 2 | 4 3 | 5 4 | 6 5 | 7 6 | 8 7 | 9 8 | 10 9 |
| 2 | 3 2 | 4 4 | 5 6 | 6 8 | 7 10 | 8 12 | 9 14 | 10 16 | 11 18 |
| 3 | 4 3 | 5 6 | 6 9 | 7 12 | 8 15 | 9 18 | 10 21 | 11 24 | 12 27 |
| 4 | 5 4 | 6 8 | 7 12 | 8 16 | 9 20 | 10 24 | 11 28 | 12 32 | 13 36 |
| 5 | 6 5 | 7 10 | 8 15 | 9 20 | 10 25 | 11 30 | 12 35 | 13 40 | 14 45 |
| 6 | 7 6 | 8 12 | 9 18 | 10 24 | 11 30 | 12 36 | 13 42 | 14 48 | 15 54 |
| 7 | 8 7 | 9 14 | 10 21 | 11 28 | 12 35 | 13 42 | 14 49 | 15 56 | 16 63 |
| 8 | 9 8 | 10 16 | 11 24 | 12 32 | 13 40 | 14 48 | 15 56 | 16 64 | 17 72 |
| 9 | 10 9 | 11 18 | 12 27 | 13 36 | 14 45 | 15 54 | 16 63 | 17 72 | 18 81 |

82

INVENTORS.
ROBERT M. TILLMAN
STANLEY SCHNEIDER
BY James J. Ward
ATTORNEY

INVENTORS.
ROBERT M. TILLMAN
STANLEY SCHNEIDER
BY James J. Wood
ATTORNEY

ELECTROMAGNETIC TRANSDUCERS

Filed June 7, 1961

6 Sheets-Sheet 4

*INVENTORS.*
ROBERT M. TILLMAN
STANLEY SCHNEIDER
*BY* James J. Wood
ATTORNEY

INVENTORS.
ROBERT M. TILLMAN
STANLEY SCHNEIDER
BY James J. Wood
ATTORNEY

Dec. 6, 1966 R. M. TILLMAN ETAL 3,290,512

ELECTROMAGNETIC TRANSDUCERS

Filed June 7, 1961 6 Sheets-Sheet 6

INVENTORS.
ROBERT M. TILLMAN
STANLEY SCHNEIDER
BY James J. Wood
ATTORNEY

United States Patent Office 3,290,512
Patented Dec. 6, 1966

3,290,512
ELECTROMAGNETIC TRANSDUCERS
Robert M. Tillman, Willow Grove, and Stanley Schneider, Newtown Square, Pa., assignors to Burroughs Corporation, Detroit, Mich., a corporation of Michigan
Filed June 7, 1961, Ser. No. 115,557
15 Claims. (Cl. 307—88)

This invention relates to electromagnetic transducers and more particularly, to magnetic devices for performing the essential functions of a digital data processing system: logical operations, storage or delay control.

In the prior art there are known fixed program store memories which utilize magnetic tape-wound or ferrite cores in what is known as a wire-core memory. These are word organized memories in which a ONE or ZERO output from the sense or word winding is obtained by the technique of linking or not linking a plurality of magnetic cores by passing or failing to pass the drive winding through the respective core apertures. This is a rather expensive procedure. The cost of providing individual cores for each bit, compounded with the hand labor involved in wiring the memory makes the overall cost excessive, if not prohibitive in many applications. Any errors that result from hand wiring may only be discovered after painstaking testing and debugging, which in many cases involves a substantial rework of the memory.

The invention disclosed herein provides a low cost fixed program storage memory that is amenable to automatic production techniques thereby eliminating hand wiring with its concomitant errors. Further, it eliminates the requirement for discrete bit cores and at the same time provides a high packing density. The factors of cost and packing density are important in providing an economical and compact fixed storage memory medium.

In accordance with one illustrated embodiment of the invention there is provided an electromagnetic transducer comprising a plurality of cores of magnetic material having wound thereon a number of turns to provide SENSE or BIT windings. Wound orthogonal to these plurality of SENSE windings are a plurality of READ CIRCUIT means which magnetically couple or fail to couple the several SENSE WINDINGS respectively to define a ONE or a ZERO in a selected binary coded number system, whereby upon interrogation of the READ CIRCUIT means, an output is produced in those SENSE lines where magnetic coupling exists between the SENSE winding and the READ circuit means.

One object of the instant invention is to provide an electromagnetic transducer which is simple to construct and to duplicate by mass production techniques.

Another object of the instant invention is to provide an electromagnetic transducer which may be utilized as a fixed program storage memory that is of low cost and has a high packing density.

A still further object of the invention is to utilize a novel electromagnetic transducer in an arithmetic table look-up device.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Figure 1:
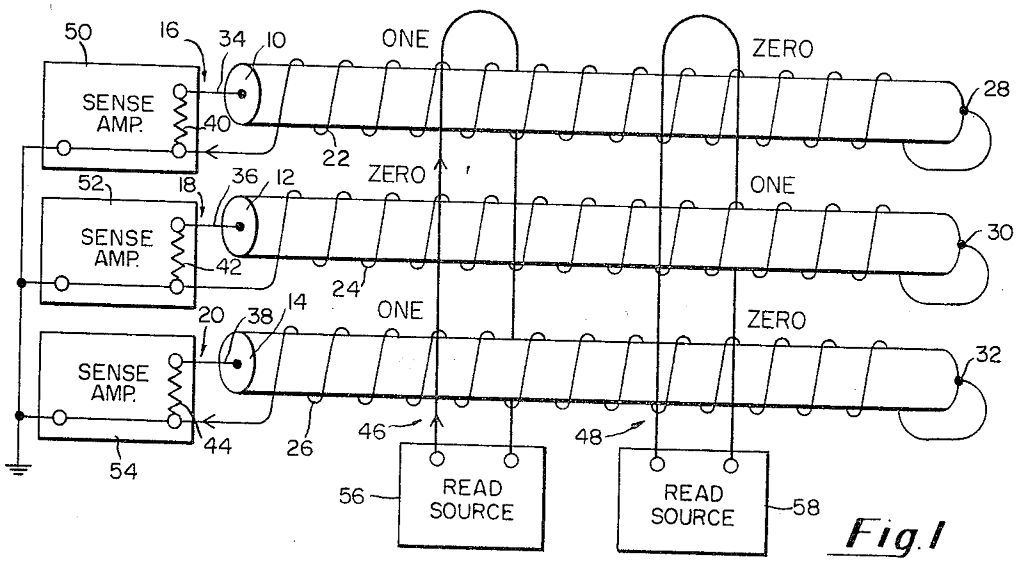
FIG. 1 is a schematic showing of a word organized, random access memory in accordance with one illustrated embodiment of the invention.

Referring now to FIG. 1, there is shown an embodiment of the invention which is illustrated as a word organized random access memory. In this embodiment only two three-bit words are shown. A plurality of magnetic wires or rods of magnetic wire indicated at 10, 12 and 14 are positioned in parallel array. In one practical embodiment the magnetic material was molypermalloy, heat treated for maximum permeability. Other materials such as soft iron or pure nickel also may be utilized but performance is not quite as satisfactory because of their lower permeability. The SENSE or BIT windings indicated generally at 16, 18 and 20 are prepared by winding fine copper wires 22, 24, 26 in closely spaced solenoid fashion around the cores 10, 12 and 14 respectively. The copper wires 22, 24, 26 are secured to the rods 10, 12 and 14 as indicated at 28, 30, 32 in any convenient manner such as by soldering. Wires 34, 36 and 38 are secured to the cores 10, 12 and 14. The resistors 40, 42 and 44 are secured to the SENSE windings 16, 18 and 20 as shown.

CIRCUIT or WORD means indicated generally at 46 and 48 are arranged so as to magnetically couple or fail to couple the solenoid windings 16, 18 and 20 as shown in the drawing. The linking or non-linking of the CIRCUIT means with the solenoid windings is predicated on the particular binary code system selected, the linking in this embodiment being arbitrarily denominated a ONE and the non-linking being denominated a ZERO. Thus the read windings 46 and 48, when properly energized, provide the signals 101 and 010 respectively.

The SENSE or BIT windings 16, 18 and 20 are connected to SENSE amplifiers 50, 52 and 54 shown in block form. CIRCUIT means 46 and 48 are connected to READ sources 56 and 58 respectively. The components 50, 52, 54, 56, 58 shown in block form are conventional devices well known in the art. Any of the many available SENSE amplifiers or detectors will satisfy the requirements for devices 50, 52, 54. Also, any convenient pulse source may be used for devices 56 and 58.

In operation of the device of FIG. 1, it will be assumed that CIRCUIT or WORD means 46 is to be interrogated. A current pulse of short duration is applied to the means 46 in the direction shown by the arrow head. By magnetic induction a current is induced in windings 16 and 20 in the direction shown by the arrow heads. The resulting output signal is developed across resistors 40, 44 and detected by SENSE amplifiers 50, 54. No output, other than a slight noise pulse is developed in winding 18 because there is no linking with CIRCUIT means 46. Similarly, the information content of WORD means 48 can be obtained. For example, if WORD means 48 is interrogated by a short pulse, an output would be obtained from SENSE winding 18. The WORD means 46, 48 etc. may be spaced quite close together because in a word organized memory all word lines are open circuit except the one being interrogated.

Figure 2:
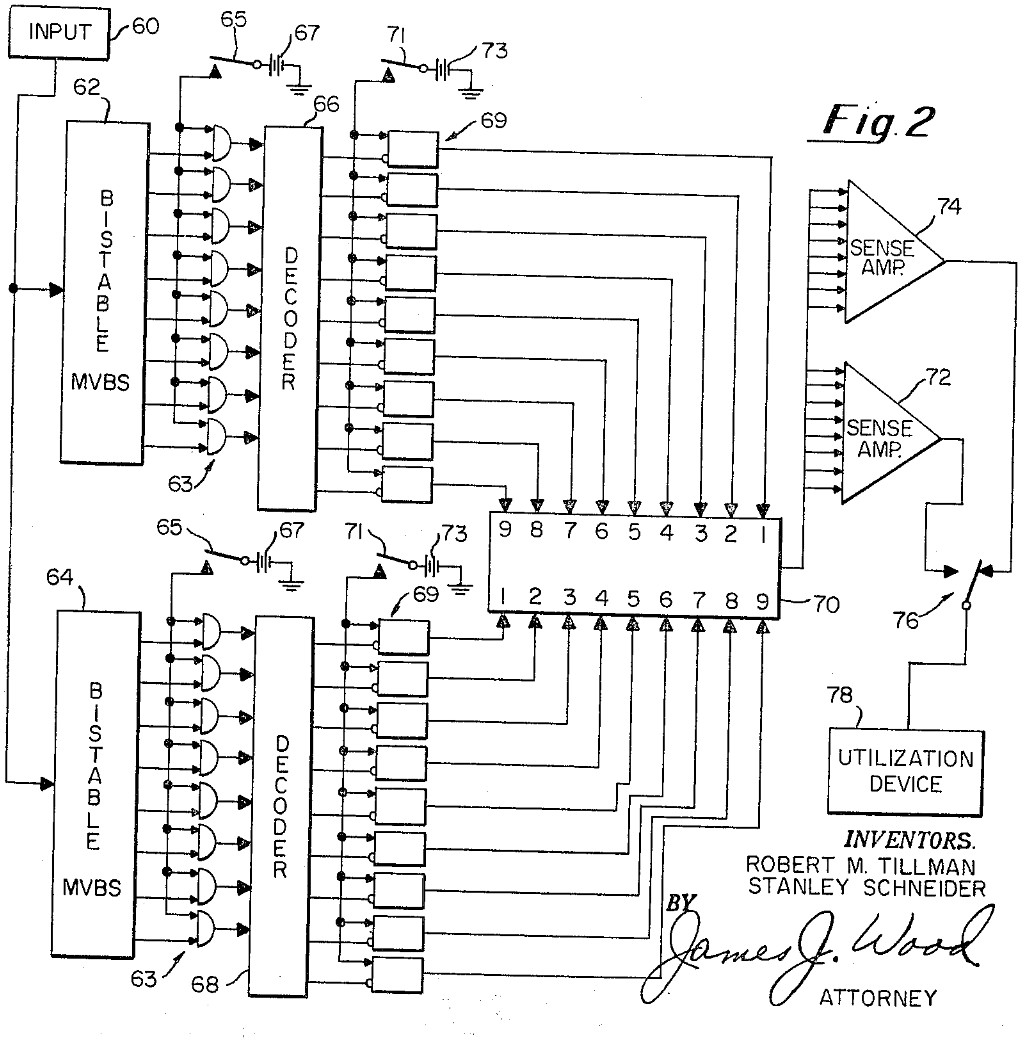
FIG. 2 is a decimal adder-multiplier utilizing the principles of the invention described in FIG. 1.

The versatility of the transducer in performing the myriad operations encountered in the computer art will be illustrated in FIG. 2 which depicts a generalized diagram of an arithmetic system for performing multiplication and addition. In this multiplier-adder the two numbers to be added or multiplied are supplied from an INPUT indicated generally at 60 to banks of bistable multivibrators 62, 64. Each bank comprises four flip flops the output of each flip flop being applied to AND gates indicated generally at 63. Each of the AND gates is provided with another input, here indicated symbolically by a switch 65 and a battery 67. The outputs of the AND gates are fed to decoders 66, 68 which as the identification implies translates the binary coded signals to the familiar decimal forms. The outputs from decoders 66, 68 are applied respectively to the inhibitor terminals of inhibitor gates indicated generally at 69; the other input to the inhibitor gates 69 is here indicated symbolically by a switch 71 and a battery 73. As will be explained the selected inhibitor gate is applied to a "table look-up" or memory indicated generally at 70. The output from the memory 70 is supplied simultaneously to a multiplication SENSE amplifier indicated generally at 72 and summation SENSE amplifier indicated generally at 74. Each of the respective SENSE amplifiers 72, 74 is supplied with eight bits of information. Any appropriate switching means, here indicated as a switch 76, is adapted to make the selection between multiplication and addition by making electrical connection with the multiplication or summation sense amplifier, and the appropriate signal is then delivered to a utilization device indicated generally at 78. In practice the utilization device may be variously a shift register or accumulator, a temporary storage etc.

The banks of multivibrator means 62, as previously stated, comprises a plurality of flip flops, and in this particular embodiment there are four in number. The code selected is the 8421 binary-coded decimal code. As is well known in the art, since either one or the other amplifying element of the flip flop, i.e., vacuum tube or transistor, is conductive at all times, the flip flop may be utilized to designate the ONE and ZERO states in a number system using a radix 2. In the embodiment here, the flip flop outputs *a'a, b'b, c'c, d'd* have the weighted values 8421 respectively. The primed designations have the value ZERO and the unprimed designations have the value ONE. Any given letter together with its prime indicates symbolically the conditions of a discrete flip flop. The word output provided by the multivibrator means 62, 64, is fed to the AND gates 63. The AND gates will only have an output when both of its inputs are at a high D.-C. level so the 0 or 1 state of the respective flip flops may be identified.

The respective decoders may be fabricated by using the techniques described and illustrated in FIG. 1. A decoder using these principles is shown schematically in FIG. 3. The convention for coupling or no coupling is shown in this figure. The horizontal lines represent symbolically the CIRCUIT or WORD means 46, 48 shown in FIG. 1. Similarly, the vertical lines are the equivalent to the BIT or SENSE windings 16, 18 and 20 of FIG. 1; in connection with this particular application these BIT lines have the decimal values 1 to 9. If we assume that the multivibrator bank 62 selects a 4, this would have a value of 0100 in the 8421 code. Accordingly, pulses are applied to lines *a', b, c', d'* which serve as the word input to the decoder 66. When lines *a', b, c'* and *d'* are energized there is a resulting output on every line but the one identified as 4: input *a'* results in outputs 8, 9; input *b* results in outputs 1, 2, 3, 8, 9; inputs *c'* results in outputs 2, 3, 6, 7 and input *d'* results in outputs 1, 3, 5, 7, 9. The signals on lines 1, 2, 3, 5, 6, 7, 8 and 9 are applied to the inhibited terminals of inhibitor 69 thus preventing their operation when the switch 71 is closed. In this manner only the inhibitor gate associated with the decimal 4 passes an output signal to the memory 70.

In another arrangement a plurality of magnetic cores are provided, one for each of the digits 1 to 9. The eight outputs from the decoder are applied through transistors to set the magnetic cores. During the next pulse period a drive pulse is applied to the cores driving them in the set direction; only the core in the reset state would provide an output which is then applied to memory 70. Appropriate means are of course provided for clearing or resetting the cores after selection.

Figures 3, 4:
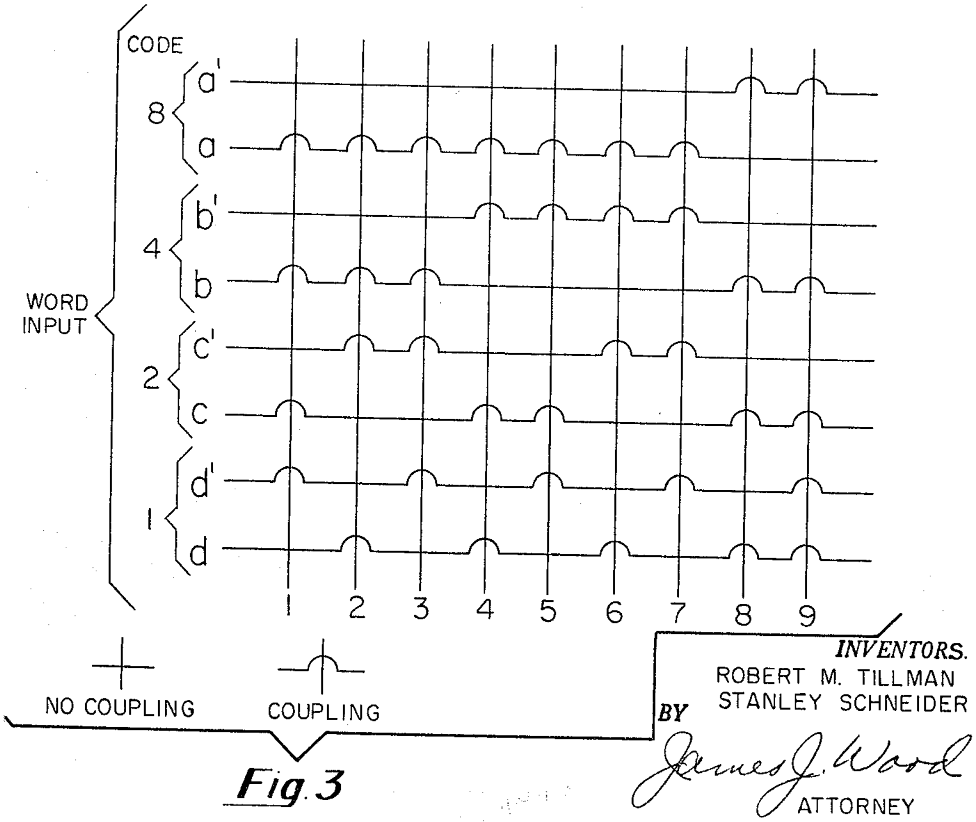
FIG. 3 is a schematic diagram of a decoder utilizing the principles of the present invention.
FIG. 4 is an addition-multiplication answer table used in the description of FIG. 2.

The memory 70 will deliver the product and the sum of the two numbers which are applied to its inputs. The table shown in FIG. 4 represents all possible combinations of sums and products of two numbers *a* and *b* where each number may have a decimal value from 1 to 9. These answers are arranged in a convenient form in this table. The number in the upper left hand corner of a box represents the sum and the number in the lower right hand corner represents the product of the inputs which appear at the sides of the table.

Figure 5:
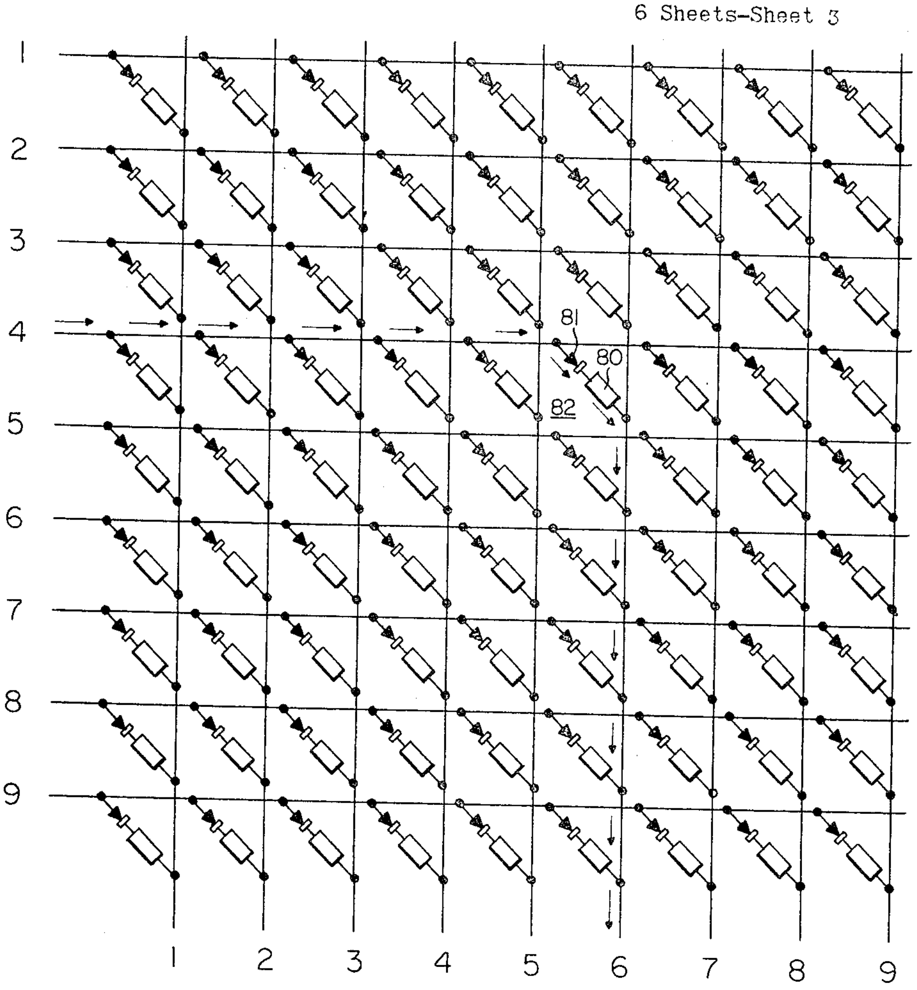
FIG. 5 is a schematic shown of a memory plane matrix utilized in the embodiment of FIG. 2.
Figure 6:
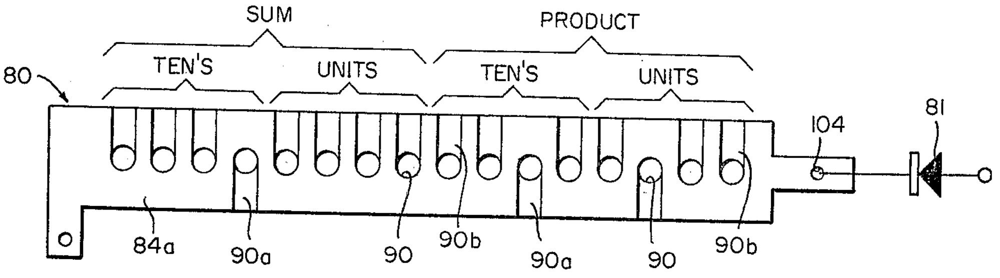
FIG. 6 is a top plan view of a printed circuit element in accordance with the invention.

A practical embodiment for realizing the "table look-up" or memory will now be described; in connection with FIGS. 5, 6, 7, 8 and 9. The table of FIG. 4 is realized in the matrix form as shown in FIG. 5. The CIRCUIT means similar to 46 of FIG. 1 is a printed circuit element identified by numeral 80. The element 80 is shown in greater detail in FIGS. 6 and 7.

It will be convenient to assume that it is desired to determine the sum and product of 4 and 6. The answer is shown in box 82 of FIG. 4. The printed circuit element identified as 80 in FIG. 5 will provide the answer in coded form; sum 0001 0000 product 0010 0100. The element 80 shown in FIG. 6 has been cut or etched to provide the sum 10 and the product 24 in coded form. This will be made clear as the description proceeds.

As may be seen in FIG. 5, there are 81 printed circuit elements in the matrix, one for each box of the table shown in FIG. 4. A diode 81 is connected to each printed circuit element 80 so that current flow is unidirectional. The identification of the particular element 80 is by X–Y selection. As may be seen in FIG. 5, the inputs 4 and 6 result in current flow in the direction indicated by the arrows. The SENSE or SOLENOID windings are arranged normal to the plane of FIG. 5. In the interest of clarity no attempt has been made to show these SENSE windings in FIG. 5.

Figure 7:
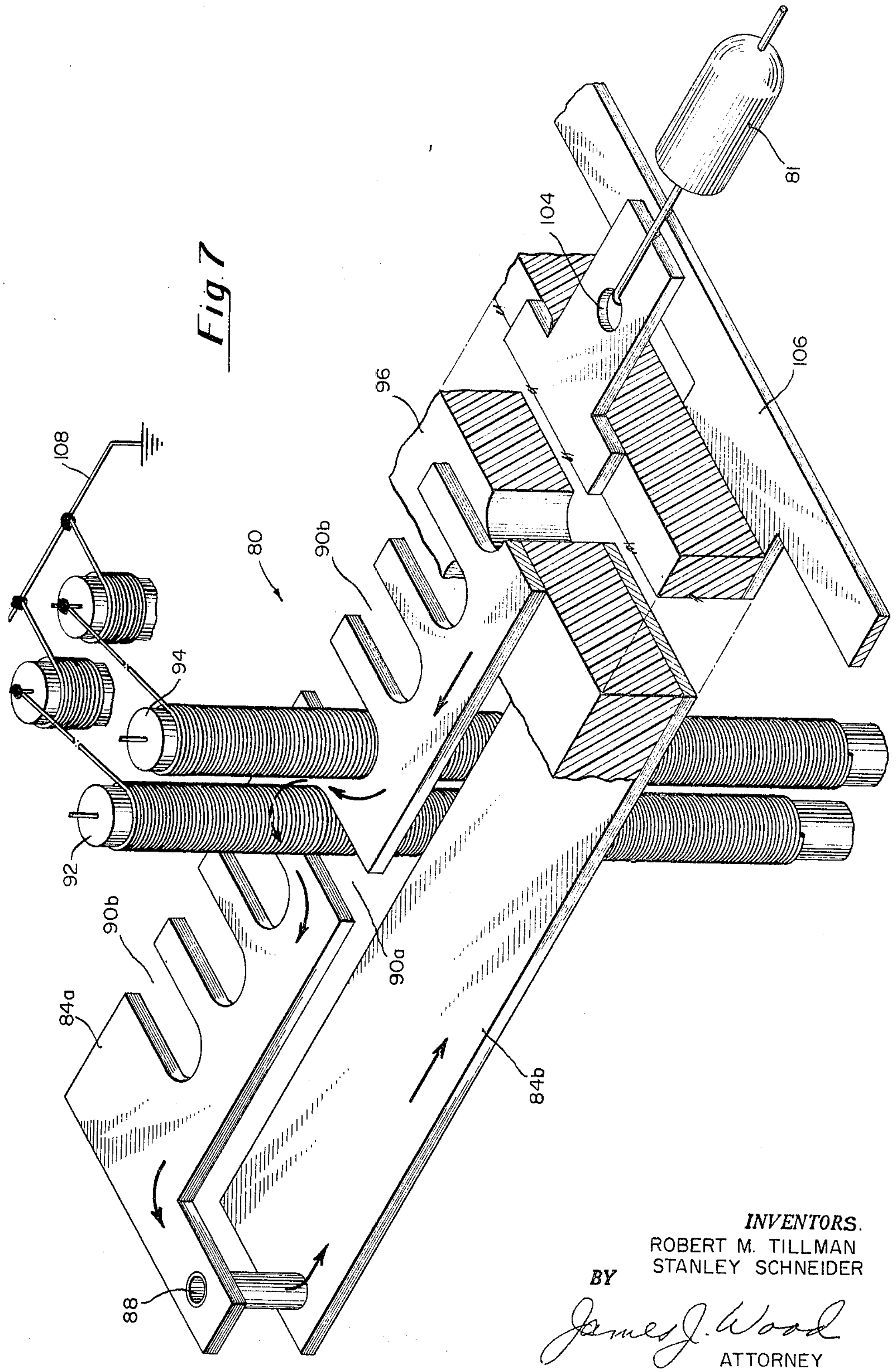
FIG. 7 is a pictorial view, partially in section, of the printed circuit element shown in FIG. 6.

Referring now to FIG. 7, the printed circuit element 80 comprises two electrically conductive planes **84*a*, 84*b* arranged on both sides of a dielectric member 96, and electrically interconnected at one end by means of a plated through hole 88 so as to form a hairpin-like conductor. The first plane 84*a* is provided with a plurality of apertures indicated generally at 90, arranged to extend transversely in one predetermined direction from a hole located on the longitudinal center line of the first conductive plane member. These apertures provide the requisite linking or non-linking as required in accordance with the selected binary code. Accordingly, an aperture identified as 90*a* will provide a linking while an aperture arranged such as 90*b* will provide no linking. The SENSE or SOLENOID windings 92, 94** are adapted to pass through these apertures and deliver the identifying output signal to appropriate SENSE amplifiers.

In operation the X–Y selection of a particular printed circuit element causes a current to be sent in the direction shown by the arrows, the current following a curved path in the first plane as made necessary by reason of the apertures; it then passes through the plated hole 88 and returns through the second conductive plane **84*b*. As may be seen from a study of FIG. 7, in the region of solenoid 94 the current paths in the first and second conductive planes are in the opposite directions so that effectively the magnetic inductive effect of these currents on solenoid 94 is cancelled. Conversely, in the region of solenoid 92 the current paths in the first and second conductive planes are additive so that a magnetomotive force will be induced in solenoid 92 in accordance with Lenz's law. The hypothetical case selected, viz., inputs 4 and 6, will result in input signals in binary form: sum 0001 0000 product 0010 0100. This may be traced from the arrangement of apertures shown in FIG. 6. Completing the picture, these coded outputs will be applied to the sense amplifiers 72, 74 (FIG. 2) and it will be necessary to select which operation, i.e., addition or multiplication is desired. The coded answer (sum or product) is then applied to the utilization device 78**.

Figure 8:
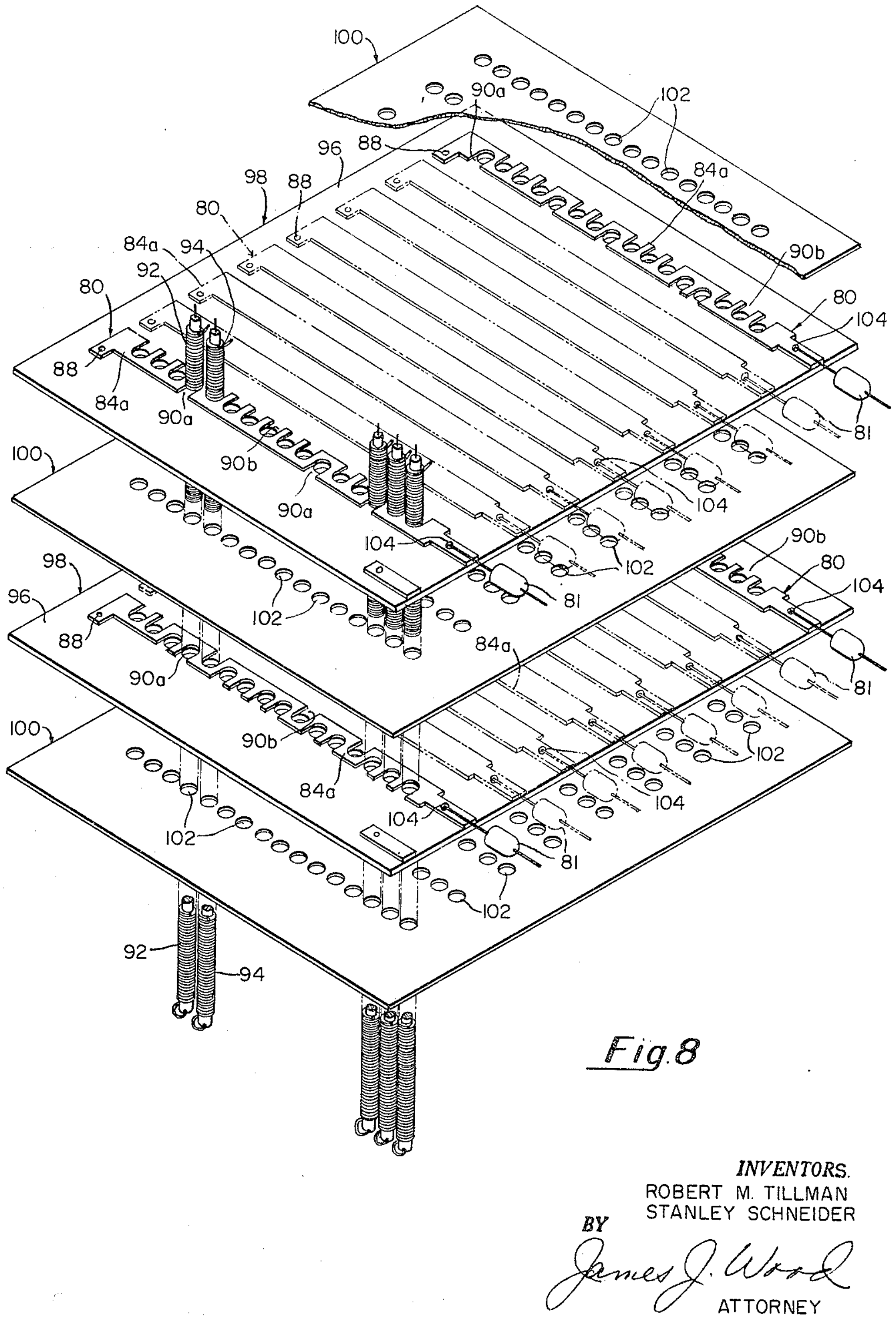
FIG. 8 is a pictorial view of a plurality of memory planes and spacers arranged in stacking array to provide a fixed program storage memory.
Figure 9:
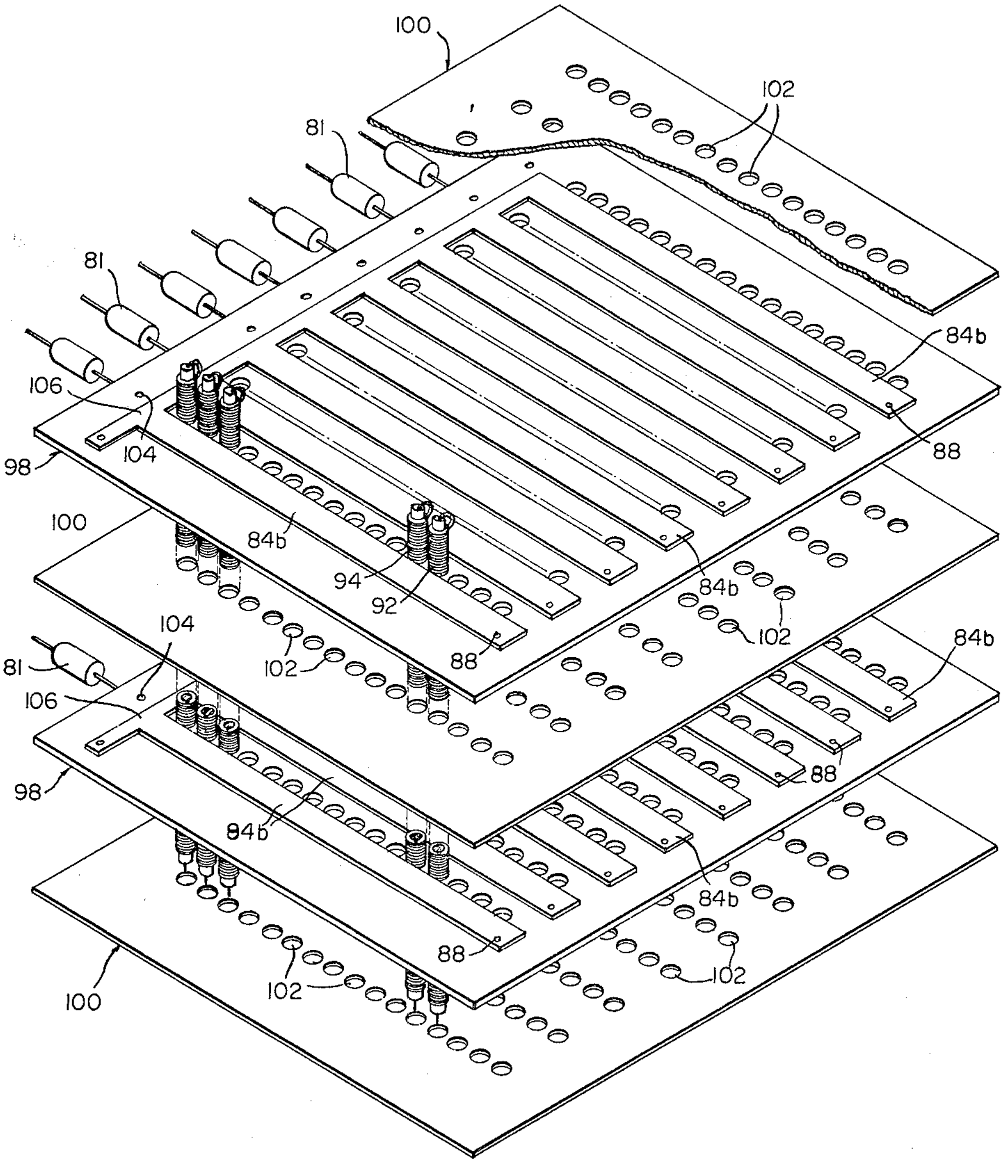
FIG. 9 is a pictorial view similar to FIG. 8, showing the bottom side of a memory plane.

The memory 70 in more practical form is shown in the stacked array depicted in FIGS. 8 and 9. In this embodiment the same numeration as in the previous figures will be utilized to identify the same or similar components. The printed circuit means 80 comprises solder-coated copper placed on a glass epoxy member 96. The apertures are provided by any convenient means such as etching. In between the memory planes, indicated generally at 98, there is sandwiched a spacer member 100 which may be of any suitable insulation material. The spacer member 100 is provided with a plurality of holes 102 which are vertically aligned with the corresponding holes in the printed circuit element 80 to permit the solenoids 92, 94 etc., to pass through. The printed circuit element 80 is provided at one end with hole 104 through which connection is made to diode 81. The back side of the memory plane 98 is more clearly shown in FIG. 9. The respective printed circuit elements 80 in each memory plane are placed in a common return path by means of connective portions 106. The solenoids are interconnected to ground at one end by means of wire 108 (FIG. 7).

Obviously, many modifications and variations of the present invention are possible in the light of the above teachings. It is therefore to be understood that within the scope of the appended claims the invention may be practiced other than the specifically described and illustrated.

What is claimed is:

1. An electromagnetic transducer comprising, a plurality of solenoid windings each wound on a different core of magnetic material and electrically connected thereto at one end, circuit means selectively coupling at least one of the plurality of solenoid windings so as to provide mutual coupling or no coupling with the respective solenoid windings, the mutual coupling or no coupling defining, respectively, a ONE or a ZERO in the binary coded number system, said plurality of solenoid windings being adapted to deliver output-sense signals upon the application of an input-read signal to said circuit means.

2. An electromagnetic transducer comprising, a plurality of solenoid windings each wound on a different core of magnetic material, a plurality of circuit means each encircling only selected ones of said plurality of solenoid windings so as to provide mutual coupling or no coupling with the respective solenoid windings, the mutual coupling or no coupling respectively defining a ONE or a ZERO in the binary coded number system, said plurality of solenoid windings being adapted to deliver output-sense signals upon the application of an input-read signal to said circuit means.

3. An electromagnetic transducer according to claim 2 in which the core material is molypermalloy.

4. An electromagnetic transducer according to claim 2 in which said solenoid windings are arranged orthogonal to said circuit means.

5. An electromagnetic transducer according to claim 2 in which each of said circuit means comprises, two conductive planar elements in spaced array, one of which has openings selectively extending transversely on either side of the longitudinal center line thereof in predetermined pattern in accordance with the binary coded number system, the other element being electrically connected to the first planar element, the arrangement providing a current path through said first and second conductive planar elements such that the magnetic field components associated with the current are additive or subtractive to provide coupling or no coupling with the respective solenoid windings.

6. An electromagnetic transducer according to claim 5 in which the two conductive planar elements are arranged in spaced array by means of a dielectric member.

7. An electromagnetic transducer according to claim 2 in which said circuit means comprises a printed circuit consisting of two solder-coated copper plane members arranged on a glass-epoxy member, the first plane member having openings selectively extending transversely on either side of the longitudinal center line thereof in predetermined pattern in accordance with the binary coded number system, the solenoid windings passing through the respective openings, and the current through the circuit means, by reason of the arrangement of the openings, producing magnetic field components associated therewith which are additive or subtractive to provide coupling or no coupling, respectively, with the solenoid windings.

8. A magnetic memory array comprising, memory planes and spacer planes alternately arranged in stacking array, each memory plane comprising a plurality of circuit means, each respective circuit means comprising, two conductive plane members electrically interconnected and insulated from each other in sandwich fashion to provide a single conductive path, the first plane member having openings extending transversely to the right or left of the longitudinal center line of said first plane member in predetermined pattern in accordance with a selected binary coded number system, and a plurality of sense windings comprising a solenoid wound on a magnetic core and arranged to pass through said openings in a direction normal to said memory plane, whereby upon interrogation of the circuit means the sense windings electromagnetically associated therewith provide an output signal or no signal in accordance with the direction of the openings in said first conductive plane member relative to the second conductive plane member.

9. A magnetic memory array according to claim 8 in which the two conductive plane members are arranged on opposite sides of a dielectric member.

10. A magnetic memory array according to claim 8 in which the plurality of the circuit means are arranged on opposite sides of a glass-epoxy member, each circuit means comprising a printed circuit comprising first and second solder-coated copper plane members on the opposite sides of said glass-epoxy member respectively, the first plane member being arranged to provide openings extending transversely on either side of the longitudinal center line of said first plane member in predetermined pattern in accordance with the selected binary coded number system, the solenoid windings passing through said openings, the second plane member being electrically connected with the first plane member and arranged so that the solenoid windings pass by an edge of said second plane member and experience magnetic field components upon passage of current through said circuit means which are additive or subtractive to provide coupling or no coupling respectively with the solenoids associated with the respective circuit means.

11. A multiplication stored table look-up device comprising a plurality of row lines and a plurality of column lines, means energizing a selected row line and a selected column line corresponding to a multiplier digit and a multiplicand digit, a product storage device located respectively at the cross-over points of said plurality of row lines and column lines, each said product storage device having a plurality of solenoid windings each wound on a different core of magnetic material in coupling or non-coupling relationship to said storage device in accordance with a preselected coded number system, said product storage device located at the selected cross-over point permitting an appropriate product coded signal output to appear on the plurality of solenoid windings which have cores in coupling relationship.

12. An adder-stored table look-up device comprising a plurality of row lines and a plurality of column lines, means energizing a selected row line and a selected column line corresponding to an addend digit and an augend digit, a sum storage device located respectively at the cross-over points of said plurality of row lines and column lines, each said sum storage device having a plurality of solenoid windings each wound on a different core of magnetic material in coupling or non-coupling relationship to said storage device in accordance with a preselected coded number system, said sum storage device located at the selected cross-over point permitting an appropriate sum coded signal output to appear on the plurality of solenoid windings which have cores in coupling relationship.

13. A conductive element for utilization in a data storage and retrieval device comprising: at least one body of magnetizing material, a plurality of circuit means each electrically and magnetically coupled to a portion thereof and conductive means arranged to cooperate with said magnetizable material in proximity thereto, said conductive means being preformed so that the electrical conductive path therethrough selectively physically links at least a portion of the magnetizable material for providing magnetized or substantially magnetically neutral regions in at least a portion of the magnetizable material in proximity thereto and induces an output signal in at least one of said plurality of circuit means upon the application of an electrical current to said conductive means to thereby provide the basis for defining a ONE or a ZERO in a binary coded number system respectively, or conversely.

14. A conductive element for utilization in a data storage and retrieval device comprising: conductive means arranged to cooperate with magnetizable material in proximity thereto, said conductive means having openings extending transversely on either side of the longitudinal center line thereof in a predetermined pattern in accordance with a selected binary coded number system, so that the electrical conductive path therethrough selectively loops at least a portion of the magnetizable material and thereby provides magnetized or substantially magnetically neutral regions therein upon the application of an electrical current to said conductive means.

15. A word line storage device comprising an electrically conductive element having a plurality of binary signal sense designating positions along its length, a plurality of magnetic members each associated with one of said sense positions, winding means electrically and magnetically coupled to each of said magnetic members, said conductive element being preformed to selectively encircle at least a portion of only certain of said magnetic members so as to establish selective magnetic coupling to certain of said magnetic members corresponding to a desired binary signal pattern.

References Cited by the Examiner

UNITED STATES PATENTS

| | | | |
|---|---|---|---|
| 2,920,317 | 1/1960 | Mallery | 340—174 |
| 3,069,665 | 12/1962 | Bobeck | 340—174 |
| 3,175,200 | 3/1965 | Hoffman et al. | 340—174 |
| 3,184,720 | 5/1965 | Meier | 340—174 |
| 3,206,731 | 9/1965 | Richard | 340—174 |

BERNARD KONICK, *Primary Examiner.*

IRVING SRAGOW, *Examiner.*

S. M. URYNOWICZ, R. J. McCLOSKEY, *Assistant Examiners.*